[12] United States Patent
Batenburg et al.

(10) Patent No.: US 9,903,321 B2
(45) Date of Patent: Feb. 27, 2018

(54) APPARATUS AND METHOD FOR OPERATING A PLURALITY OF HYDRAULIC PUMPS

(71) Applicant: WESTPORT POWER INC., Vancouver (CA)

(72) Inventors: Gregory A. Batenburg, Delta (CA); Anuja S. Bengali, Surrey (CA)

(73) Assignee: WESTPORT POWER INC., Vancouver (CA)

( * ) Notice: Subject to any disclaimer, the term of this patent is extended or adjusted under 35 U.S.C. 154(b) by 48 days.

(21) Appl. No.: 15/032,850

(22) PCT Filed: Oct. 23, 2014

(86) PCT No.: PCT/CA2014/051030
§ 371 (c)(1),
(2) Date: Apr. 28, 2016

(87) PCT Pub. No.: WO2015/061896
PCT Pub. Date: May 7, 2015

(65) Prior Publication Data
US 2016/0252057 A1    Sep. 1, 2016

(30) Foreign Application Priority Data

Oct. 31, 2013    (CA) .................................... 2831759

(51) Int. Cl.
| F02M 1/00 | (2006.01) |
| F02M 31/18 | (2006.01) |
| F04B 23/04 | (2006.01) |
| F02M 37/00 | (2006.01) |

(Continued)

(52) U.S. Cl.
CPC ...... *F02M 31/183* (2013.01); *F02M 21/0206* (2013.01); *F02M 37/0064* (2013.01);

(Continued)

(58) Field of Classification Search
CPC . F02D 41/3845; F02D 41/20; F02M 37/0029; F02M 21/0245; F16J 1/09; F15B 9/00

(Continued)

(56) References Cited

U.S. PATENT DOCUMENTS 5,742,500 A    4/1998    Irvin
6,659,730 B2    12/2003    Gram et al.

(Continued)

FOREIGN PATENT DOCUMENTS

| CA | 2 523 732 A1 | 4/2006 |
| FR | 2 853 407 B1 | 4/2003 |
| JP | 2001-263255 A | 9/2001 |

OTHER PUBLICATIONS

International Search Report and Written Opinion, dated Jan. 20, 2015, for PCT/CA2014/051030, 8 pages.

(Continued)

*Primary Examiner* — John Kwon
(74) *Attorney, Agent, or Firm* — Seed IP Law Group LLP

(57) ABSTRACT

The problem arises of how to control a plurality of hydraulic pumps to achieve desired performance criteria, such as reduced wear and/or power consumption. The hydraulic pumps are operated in a hydraulic system for delivering hydraulic fluid to a hydraulic motor in a cryogenic pumping apparatus in an engine system fuelled with a gaseous fuel. A controller is operatively connected with the plurality of hydraulic pumps and is programmed to periodically determine a priority for each hydraulic pump as a function of predetermined criteria such as respective cumulative pumping cycles. Higher priority hydraulic pumps are operated before lower priority hydraulic pumps, that is in descending order of priority, to supply hydraulic fluid to the hydraulic motor. Hydraulic pumps are selected to operate according to the desired performance criteria.

20 Claims, 4 Drawing Sheets

(51) Int. Cl.
*F02M 21/02* (2006.01)
*F04B 15/08* (2006.01)
*F04B 49/02* (2006.01)
*F04B 49/06* (2006.01)
*F02M 37/12* (2006.01)
*F02M 59/02* (2006.01)
*F02M 59/12* (2006.01)

(52) U.S. Cl.
CPC ............ *F02M 37/12* (2013.01); *F02M 59/02* (2013.01); *F02M 59/12* (2013.01); *F04B 15/08* (2013.01); *F04B 23/04* (2013.01); *F04B 49/02* (2013.01); *F04B 49/065* (2013.01); *Y02T 10/32* (2013.01)

(58) Field of Classification Search
USPC ....... 123/445, 446, 472, 480, 495, 497, 500, 123/501; 417/53, 437, 440; 91/363 R, 91/392; 92/181 R
See application file for complete search history.

(56) References Cited

U.S. PATENT DOCUMENTS

| | | |
|---|---|---|
| 6,898,940 B2 | 5/2005 | Gram et al. |
| 7,356,996 B2 | 4/2008 | Brook et al. |
| 7,607,898 B2 | 10/2009 | Noble et al. |
| 7,739,941 B2 | 6/2010 | Noble et al. |
| 2009/0044528 A1 | 2/2009 | Narazaki et al. |
| 2013/0220429 A1 | 8/2013 | Batenburg et al. |
| 2016/0134122 A1* | 5/2016 | De Neve .................. H02J 3/14 307/31 |
| 2017/0211821 A1* | 7/2017 | Hardesty ............. F24D 19/1066 |

OTHER PUBLICATIONS

Extended European Search Report, dated Aug. 3, 2017, for European Application No. 14857613.5-1616 / 3069025, 8 pages.

* cited by examiner

APPARATUS AND METHOD FOR OPERATING A PLURALITY OF HYDRAULIC PUMPS

FIELD OF THE INVENTION

The present application relates to a technique of controlling a plurality of hydraulic pumps employed to supply hydraulic fluid to a hydraulic motor in a cryogenic pumping apparatus for pressurizing a cryogenic fluid for an internal combustion engine.

BACKGROUND OF THE INVENTION

Spark ignited internal combustion engines can be fuelled with liquefied natural gas (LNG) that is delivered to the engine in a gaseous form at a relatively low pressure. This is because such engines normally inject the fuel into the intake air system (e.g. port injection) or into the combustion chamber during in the intake stroke or early in the compression stroke when the in-cylinder pressure is still relatively low.

In such low pressure engine systems, the engine can be fuelled with natural gas from the vapor space referred to herein as natural gas vapor when the pressure in the vapor space is above a predetermined threshold value. The natural gas vapor is delivered to an intake manifold where it mixes with air forming an air/fuel mixture, or charge, which is then introduced into respective combustion chambers. A minimum vapor pressure is required for adequate mixing and to ensure natural gas flow rate meets the flow rate demand of the engine. The average flow rate demand of the engine may be greater than the average evaporation rate of the LNG inside the storage vessel such that over time the vapor pressure drops below the threshold value. In this situation, operation of previous spark ignited internal combustion engines had to be suspended until the pressure in the vapor space increased beyond the threshold value. As would be known to those skilled in the technology hysteresis in the vapor pressure threshold could be employed to reduce the flip-flopping between operational and non-operational engine modes. The hysteresis increases the time required for vapor pressure build up delaying when the engine could resume operation.

The Applicant has improved the state of the art by developing technologies that enable a cryogenic pump and vaporizer to supply natural gas from the liquid space to the engine when the vapor pressure drops below the threshold value. The cryogenic pump is actuated to pump LNG from the liquid space in the storage vessel through the vaporizer where it undergoes a phase change into either a supercritical or gas state. Upstream of a delivery line to the engine, an arrangement of check valves between a first supply line from the vapor space and a second supply line from the vaporizer allow the cryogenic pump to maintain the pressure in the delivery line above a predetermined value when the vapor pressure drops too low. This reduces downtime by allowing the engine to continue operating at least as long as there is sufficient LNG in the storage vessel.

In some applications it is known to use a hydraulic pump to drive the cryogenic pump that delivers LNG to the vaporizer. For example, the cryogenic pump can be a reciprocating piston-type pump which is driven by a double-acting piston in a cylinder of a hydraulic motor. A switchable valve directs hydraulic fluid from the hydraulic pump into and out of the cylinder in the hydraulic motor such that the double-acting piston reciprocates back and forth.

It is also known to employ hydraulic pumps that are directly driven by the engine. With these pumps the flow rate of hydraulic fluid is directly proportional to engine speed. Energy is wasted when unused hydraulic flow is recirculated in those regions of the engine map where engine speed is high but natural gas demand from the engine is low. For this reason it would be advantageous to decouple the direct relationship between hydraulic fluid flow rate and the speed of the internal combustion engine. This can be accomplished by employing a variable displacement hydraulic pump or an electrically driven hydraulic pump.

There are advantages to employing an electrically driven hydraulic pump when integrating a natural gas fuel system onto engines supplied by a variety of manufacturers. Both electrically driven and directly driven hydraulic pumps require plumbing for hydraulic fluid. Where the plumbing needs to be routed influences where the pumps can be placed. However, directly driven hydraulic pumps preferably need to be located close to or in line with a power take off from the engine due to the mechanical linkage required to drive the pump. In contrast the electrically driven hydraulic pump requires a wiring harness that supplies electrical power to the pump. The flexibility in routing the wiring harness allows the electrically driven hydraulic pump to be located such that the hydraulic plumbing can be simplified and to reduce the likelihood of having to modify the underlying engine. The complexity and cost of mounting electrically driven hydraulic pumps is reduced compared to directly driven hydraulic pumps.

While there are advantages associated with using one electrically driven hydraulic pump to supply the hydraulic fluid flow for the cryogenic pump, in some applications existing electrically driven hydraulic pumps cannot individually supply the maximum hydraulic fluid flow required to meet the maximum gas flow demand of the engine. This is one reason that has prevented electrically driven hydraulic pumps from being employed in the past.

A problem to be solved is how to control two or more hydraulic pumps supplying hydraulic fluid to a cryogenic pumping apparatus over the entire engine map and over the lifetime of each hydraulic pump. The state of the art is lacking in techniques for controlling such a hydraulic system.

SUMMARY OF THE INVENTION

An improved hydraulic system for delivering hydraulic fluid to a hydraulic motor in a cryogenic pumping apparatus in an engine system fuelled with a gaseous fuel. There are a plurality of hydraulic pumps where respective inlets of the hydraulic pumps are in fluid communication with a source of hydraulic fluid and respective outlets of the hydraulic pumps are in fluid communication with a delivery line in fluid communication with the hydraulic motor. A return line delivers hydraulic fluid from the cryogenic pumping apparatus to the source of hydraulic fluid. A controller is operatively connected with the plurality of hydraulic pumps and programmed to periodically determine a priority for each hydraulic pump as a function of predetermined criteria. The higher priority hydraulic pumps are operated before lower priority hydraulic pumps to supply hydraulic fluid to the hydraulic motor. The controller determines gas flow demand of the engine system, which is the gaseous fuel flow rate demanded by the engine, and calculates hydraulic flow demand required for the hydraulic motor to actuate the cryogenic pumping apparatus to provide the gas flow demand. Hydraulic pumps are selected to operate by the controller as function of predetermined performance criteria. Each hydraulic pump that is operated has at least an equal priority and preferably a higher priority than each hydraulic pump that is not operated.

The priority for each hydraulic pump is determined as a function of at least one of a count of respective cumulative pumping cycles; a count of cumulative compression strokes of the cryogenic pumping apparatus while respective hydraulic pump speed is nonzero; area under respective pressure versus time curves when respective hydraulic pumps are operating; and area under respective current versus time curves when respective hydraulic pumps are operating. Pump priorities are determined when at least one of the following priority assignment events occurs: the controller is powered on, the engine system is powered on, hydraulic pump status for anyone of the plurality of hydraulic pumps changes, after a predetermined amount of time since a previous priority assignment event, and the cryogenic pumping apparatus changes from a suspended state to an operational state.

In a preferred embodiment, when two or more hydraulic pumps are selected to operate each one of these hydraulic pumps provides an identical hydraulic flow rate. Alternatively, when two or more hydraulic pumps are selected to operate, the selected hydraulic pump with the lowest priority supplies a hydraulic flow rate less than a maximum hydraulic flow rate, and the selected hydraulic pumps with priorities greater the lowest priority selected pump provide the maximum hydraulic flow rate. In another preferred embodiment, a minima point on a power consumption versus hydraulic flow rate surface is determined whereby a power signal for each hydraulic pump can be determined such that hydraulic flow demand is supplied when the selected hydraulic pumps are operated with respective power signals. Alternatively, or additionally, the selected hydraulic pumps are operated in at least one of a first mode comprising equalizing hydraulic fluid flow from each hydraulic pump within a predetermined flow tolerance; a second mode comprising equalizing power consumption of each hydraulic pump within a predetermined power tolerance; a third mode comprising equalizing hydraulic pump speed of each hydraulic pump within a predetermined speed tolerance; a fourth mode comprising equalizing volumetric flow rate versus power consumption for each hydraulic pump within a predetermined tolerance; and a fifth mode comprising selecting a power consumption for each hydraulic pump as a function of at least one of the hydraulic fluid flow rate, hydraulic fluid outlet pressure, hydraulic fluid temperature, hydraulic pump input current, hydraulic pump input voltage and hydraulic fluid viscosity whereby a power consumption is reduced compared to the first, second, third and fourth modes.

The plurality of hydraulic pumps can be electrically driven hydraulic pumps and/or variable displacement hydraulic pumps. At least one hydraulic pump can be specified differently than the other hydraulic pumps. For example, the hydraulic pumps can be the same type of hydraulic pumps but one of these pumps is specified with different performance criteria, such as maximum hydraulic flow rate. Alternatively, the hydraulic pumps can comprise different types of pumps.

In a preferred embodiment there is a cryogenic storage vessel. The engine system is fuelled with the gaseous fuel from a vapor space in the cryogenic storage vessel when pressure in the vapor space is above a predetermined value, and from a liquid space in the storage vessel when the pressure is below the predetermined value. The cryogenic pumping apparatus pressurizes gaseous fuel from the liquid space. The gaseous fuel can be one of butane, ethane, hydrogen, methane, propane, natural gas and mixtures of these fuels, among others.

An improved system for delivering fuel to an internal combustion engine comprises a fuel pump, a hydraulic motor for the fuel pump, a plurality of hydraulic pumps, arranged in parallel to pump hydraulic fluid from a hydraulic fluid reservoir to the hydraulic motor; and a controller in communication with the engine and the hydraulic pumps. The controller receives inputs and is programmed to determine a commanded speed for the fuel pump. The controller is further programmed to determine a priority for each hydraulic pump as a function of predetermined criteria, wherein higher priority hydraulic pumps are operated before lower priority hydraulic pumps to supply hydraulic fluid to the hydraulic motor and to determine which ones of the hydraulic pumps operate to deliver hydraulic fluid to the hydraulic motor. Conduits for delivering hydraulic fluid from the reservoir to the plurality of hydraulic pumps, from the plurality of hydraulic pumps to the hydraulic motor, and then from the hydraulic motor back to the reservoir are provided. Valves are controlled by the controller to direct hydraulic fluid through the conduits.

An improved method of operating a plurality of hydraulic pumps for delivering hydraulic fluid to a hydraulic motor in a cryogenic pumping apparatus in an engine system fuelled with a gaseous fuel, comprises periodically determining a priority for each hydraulic pump as a function of respective hydraulic pump wear, wherein higher priority hydraulic pumps are operated before lower priority hydraulic pumps to supply hydraulic fluid to the hydraulic motor; determining gas flow demand of the engine system; calculating hydraulic flow demand required for the hydraulic motor to actuate the cryogenic pumping apparatus to provide the gas flow demand; selecting hydraulic pumps to supply the hydraulic flow demand; and operating the selected hydraulic pumps to supply the hydraulic flow demand, each hydraulic pump that is operated has at least an equal priority and preferably a higher priority than each hydraulic pump that is not operated.

DETAILED DESCRIPTION OF PREFERRED EMBODIMENT(S)

Figure 1:
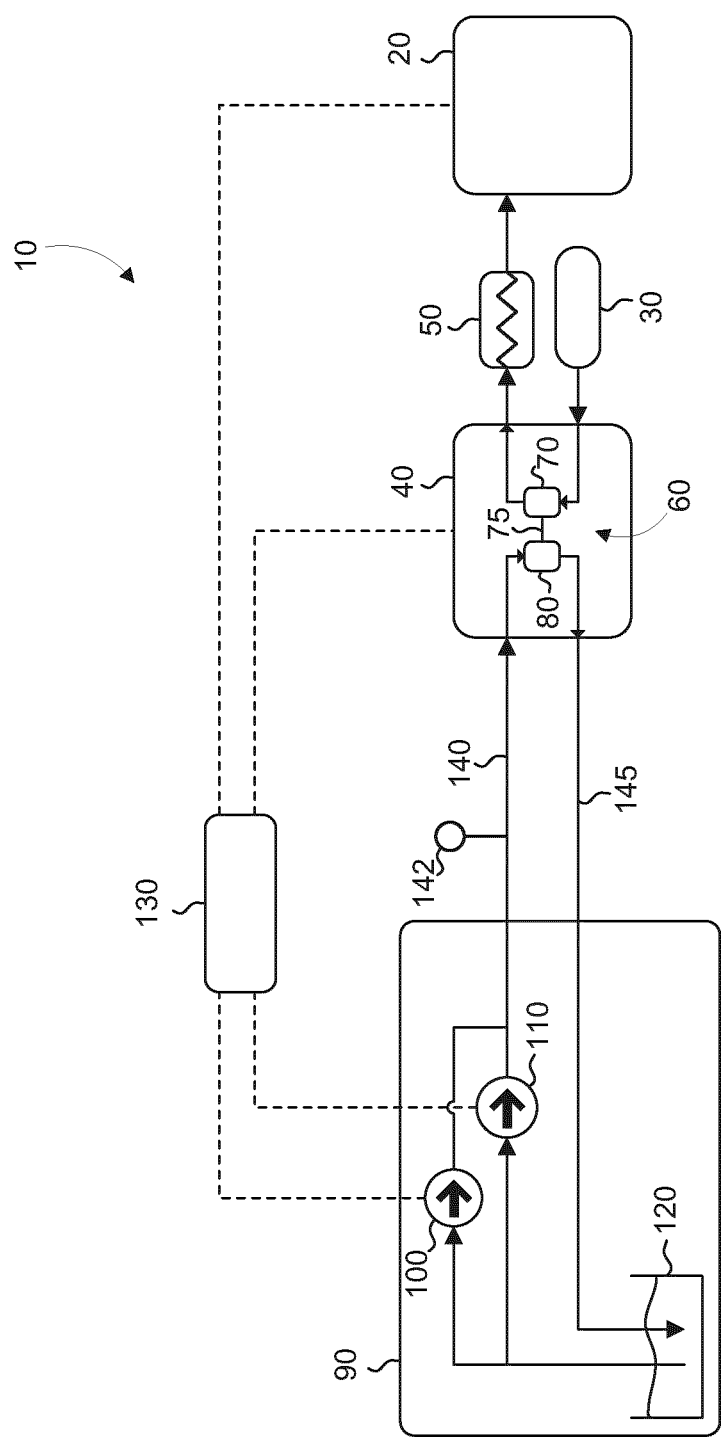
FIG. 1 is a schematic view of a hydraulic system for delivering hydraulic fluid to a cryogenic pumping apparatus comprising two electrically driven hydraulic pumps according to one embodiment.

Referring to FIG. 1, there is shown engine system 10 for fuelling internal combustion engine 20 with a gaseous fuel. The gaseous fuel is any fuel that is in a gas state at standard temperature and pressure, which in the context of this application is defined as a temperature of 0° C. and a pressure of 1 bar. Examples of exemplary gaseous fuels are butane, ethane, hydrogen, methane, propane, natural gas and mixtures of these fuels, among others. The gaseous fuel is stored in liquefied form in storage vessel 30. Cryogenic pumping apparatus 40 pumps the liquefied gaseous fuel from storage vessel 30 through vaporizer 50 where it undergoes a change of state to the gas state or the supercritical state. Cryogenic pumping apparatus 40 comprises fuel pump 60 having pumping chamber 70 that pumps the liquefied gaseous fuel and hydraulic motor 80 that drives the pumping chamber. As would be known by those familiar with the technology hydraulic motor 80 is also known as a hydraulic drive. Fuel pump 60 can be a reciprocating piston-type pump, a rotary-type pump or other types of pumps. Vaporizer 50 can employ a variety of heat sources to vaporize the liquefied gaseous fuel. Waste heat from engine 20 transferred to engine coolant circulating in a water jacket of the engine is an exemplary source of heat. The gaseous fuel is delivered to engine 20 from vaporizer 50 where it can be introduced directly into cylinders (not shown) of the engine, or upstream of intake valves (not shown) associated with respective cylinders.

Hydraulic system 90 supplies a variable flow of hydraulic fluid to pumping apparatus 40 through hydraulic line 140 and hydraulic fluid is returned to the hydraulic system through hydraulic line 145. In a preferred embodiment, hydraulic system 90 comprises electrically driven hydraulic pumps 100 and 110 arranged in parallel, which are independently operable to supply pressurized hydraulic fluid from reservoir 120 to cryogenic pumping apparatus 40 where it is employed in hydraulic motor 80 to actuate fuel pump 60. Pumping chamber 70 which receives liquefied gas from storage vessel 30. In embodiments that employ a reciprocating piston-type cryogenic pump, hydraulic motor 80 typically comprises a piston in a cylinder and hydraulic fluid is supplied to one side of the piston and drained from the other side to cause motion in one direction, and then fluid flow is reversed to cause motion in the opposite direction. Drive shaft 75 conveys the reciprocating motion from hydraulic motor 80 to a piston in a cryogenic pump cylinder that defines pumping chamber 70. Those skilled in the technology will understand that rotary-type positive displacement pumps can use a hydraulic motor that produces rotary motion.

The respective inlets of pumps 100 and 110 are each in fluid communication with reservoir 120, and the respective outlets of pumps 100 and 110 are each in fluid communication with hydraulic delivery line 140. Controller 130 commands pumps 100 and 110 to supply sufficient hydraulic fluid flow to hydraulic motor 80 to meet gas flow demand of engine 20, and to reduce wear of and/or power consumption by these pumps by decreasing hydraulic fluid flow or to slow down or stop pumping apparatus 40 to match the commanded gaseous fuel flow demand. In this application gas flow demand, also known as gaseous fuel flow demand or cryogenic fluid demand refers to the gaseous fuel flow rate required by engine 20. Similarly, hydraulic flow demand refers to the hydraulic fluid flow rate required by hydraulic motor 80 such that fuel pump 60 can meet gas flow demand. In the figures dashed lines represent communication lines between controller 130 and respective components. Controller 130 can send command signals to operate the respective components and can receive status information therefrom. Hydraulic fluid is returned from cryogenic pumping apparatus 40 to reservoir 120 through piping 145.

As will be described in more detail below, hydraulic pumps 100 and 110 are each assigned a priority periodically such that each pump is classified as one of a primary pump (highest priority) and a secondary pump (lowest priority). As used herein the term periodically is interpreted as from time to time, and does not necessarily imply at regular intervals of time, although this is possible. The primary pump is at least operated first to meet hydraulic flow demand required by hydraulic motor 80. The secondary pump is operated in addition to the primary pump when the hydraulic flow demand increases above a threshold value. The threshold value can be set according to different desired performance criteria, such as reducing wear and/or reducing power consumption of one or both of the pumps. The relative proportion of hydraulic flow from each hydraulic pump can also be set according to the desired performance criteria.

Controller 130 can comprise both hardware and software components. The hardware components can comprise digital and/or analog electronic components. In the embodiments herein controller 130 comprises a processor and memories, including one or more permanent memories, such as FLASH, EEPROM and a hard disk, and a temporary memory, such as SRAM and DRAM, for storing and executing a program. In another preferred embodiment electronic controller 130 is an engine control unit (ECU) for engine 20. As used herein, controller 130 is also referred to as 'the controller'. As used herein, the terms algorithm, module and step refer to an application specific integrated circuit (ASIC), an electronic circuit, a processor (shared, dedicated, or group) and memory that execute one or more software or firmware programs, a combinational logic circuit, and/or other suitable components that provide the described functionality. In preferred embodiments the algorithms, modules and steps herein are part of controller 130.

Figure 2:
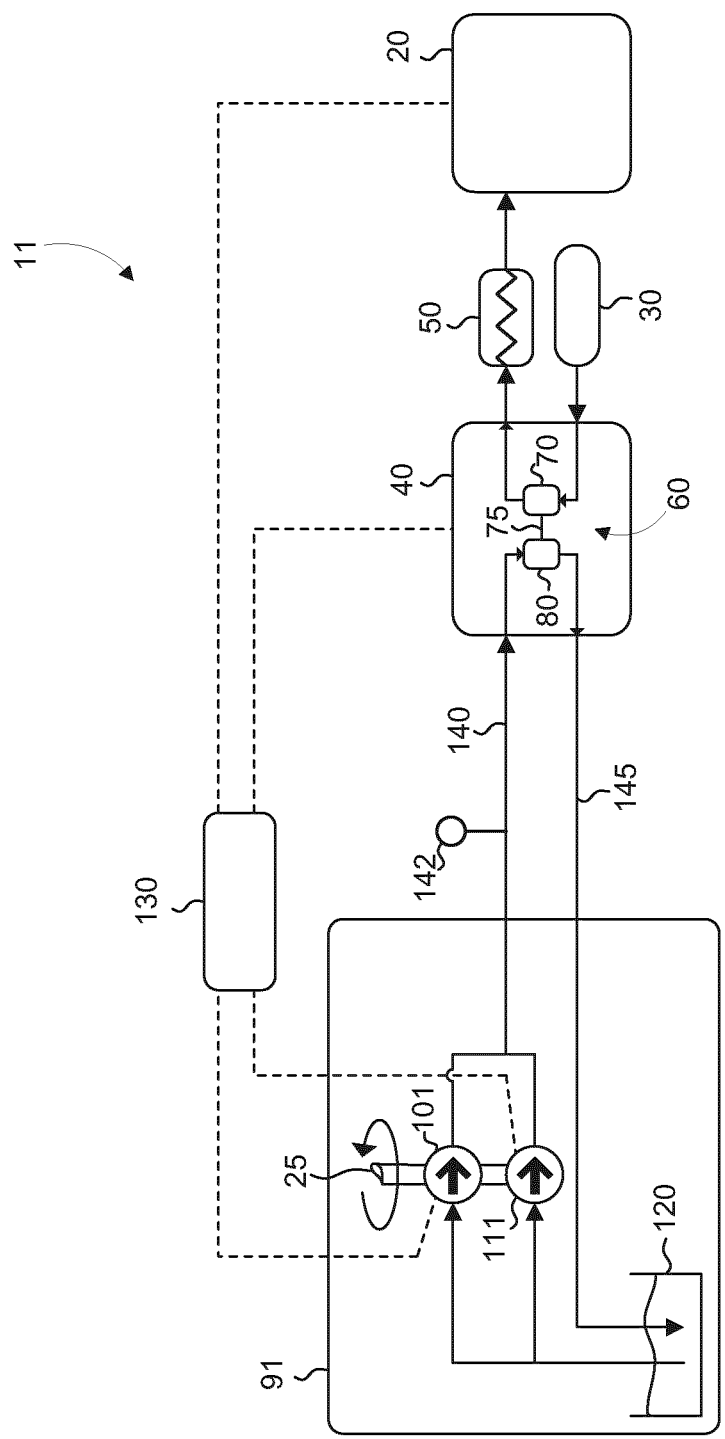
FIG. 2 is a schematic view of a hydraulic system for delivering hydraulic fluid to a cryogenic pumping apparatus comprising two variable displacement hydraulic pumps according to another embodiment.

Referring now to FIG. 2 engine system 11 is shown according to another embodiment that is similar to the previous embodiment and with respect to this embodiment and all subsequently described embodiments like parts have like reference numerals and may not be described in detail, if at all. Hydraulic system 91 comprises variable displacement hydraulic pumps 101 and 111 that are directly driven by engine 20 over mechanical linkage 25. Pumps 101 and 111 can vary their respective outlet displacements of hydraulic fluid per pump cycle while the pump is running. Controller 130 commands pumps 101 and 111 to adjust respective outlet displacements to reduce wear of and/or power consumption by these pumps. Similar to the embodiment of FIG. 1, each hydraulic pump is assigned a priority and classified as one of a primary pump and a secondary pump.

Figure 3:
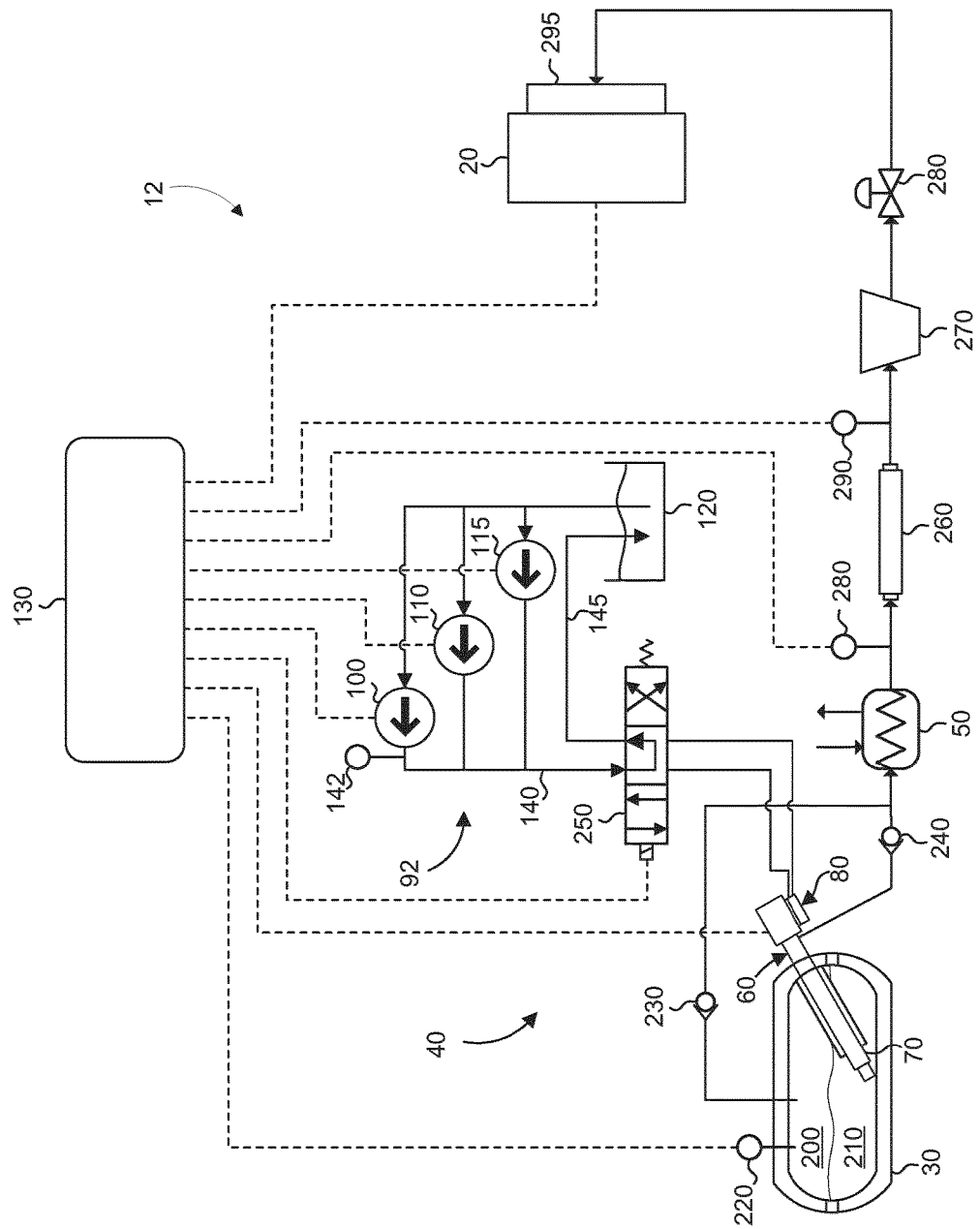
FIG. 3 is a schematic view of a hydraulic system for delivering hydraulic fluid to a cryogenic pumping apparatus comprising three electrically driven hydraulic pumps according to another embodiment.

Referring now to FIG. 3 engine system 12 is shown according to another embodiment. Engine 20 is fuelled with gaseous fuel from vapor space 200 of vessel 30 when the vapor pressure therein is above a predetermined threshold, and is otherwise fuelled with liquefied gaseous fuel from liquid space 210. Controller 130 receives signals from pressure sensor 220 indicative of pressure in vapor space 200, and actuates fuel pump 60 to meet gas flow demand of engine 20 when the pressure drops below the predetermined threshold. Check valves 230 and 240 prevent gaseous fuel backflow into storage vessel 30. In preferred embodiments, fuel pump 60 is a reciprocating piston-type positive displacement pump with a pumping piston in pump chamber 70 at a submerged end which is disposed within storage vessel 30, and a drive piston disposed in hydraulic motor 80, preferably located in the opposite end that protrudes from storage vessel 30. A drive shaft (not shown) connects the pumping piston with the drive piston to transfer reciprocating motion from hydraulic motor 80 to pumping chamber 70. Cryogenic pumps of this type are described in more detail in the applicant's co-owned U.S. Pat. Nos. 6,659,730; 6,898,940; 7,356,996; 7,607,898 and 7,739,941. Hydraulic system 92 comprises electrically driven hydraulic pumps 100, 110 and 115 for pumping hydraulic fluid from reservoir 120 through line 140 and then back to reservoir 120 through line 145. As was described previously with respect to other embodiments, and in more detail below with respect to this embodiment, each hydraulic pump 100, 110 and 115 is assigned a priority periodically such that each hydraulic pump is classified as one of a primary pump (highest priority), a secondary pump (middle priority) and a tertiary pump (lowest priority). Based upon operational data received by controller 130, these priorities are periodically re-assigned, for example so that over time, between service intervals, one hydraulic pump is not operated significantly more than the other hydraulic pumps. The hydraulic pump that is currently classified as the primary pump is at least operated first to meet hydraulic flow demand required by hydraulic motor 80. The secondary pump is operated in addition to the primary pump when hydraulic flow demand increases above a first threshold value. The tertiary pump is operated in addition to both the primary and the secondary pumps when hydraulic flow demand increases above a second threshold value. The first and second threshold values can be set according to different desired performance criteria, such as reducing wear of and/or reducing power consumption by one or all of the pumps. The relative proportion of hydraulic flow from each hydraulic pump can also be set according to the desired performance criteria.

Flow switching device 250 directs the flow of hydraulic fluid into and out of hydraulic motor 80. Flow switching device 250 comprises at least two positions, each position in turn connecting an opposite side of the drive piston with hydraulic fluid supply line 140, while the other side of the drive piston is connected to drain line 145. The direction of piston travel thereby reverses every time flow switching device is operated between these two positions, this reciprocating motion of the drive piston acting on the drive shaft to cause the pumping piston to reciprocate. A third position in flow switching device 250 allows hydraulic fluid to circulate through lines 140 and 145 while bypassing hydraulic motor 80. The third position is advantageous when the hydraulic pumps are directly driven by the engine and which cannot stop pumping hydraulic fluid when the engine is running. Module 260 dampens pressure fluctuations in the stream of gaseous fuel seen by pressure regulator 270, which adjusts gaseous fuel pressure supplied to engine 20. Controller 130 receives signals indicative of gaseous fuel temperature downstream of vaporizer 50 from temperature sensor 280 such that the controller can operate fuel pump 60 to regulate gaseous fuel temperature. Controller 130 receives signals indicative of gaseous fuel pressure downstream of module 260 such that the controller can operate fuel pump 60 to maintain the pressure upstream of pressure regulator 270 above a predetermined value. Fuel shut-off valve 280 can be closed to prevent gaseous fuel delivery to engine 20 when the engine is not operating. In other embodiments pressure regulator 270 and fuel shut-off valve 280 can be combined into a single component. Gaseous fuel can be introduced into air intake system 295 of engine 20. For example, the gaseous fuel can be introduced into the intake manifold or into intake runners upstream of intake valves associated with respective cylinders. In alternative embodiments, gaseous fuel can be directly introduced into engine cylinders. The timing of direct injections is a function of gaseous fuel pressure determined downstream from pressure regulator 270. When injecting during compression strokes of cylinders in engine 20, higher gaseous fuel pressure allows later timing when introducing the gaseous fuel.

The technique of operating a plurality of hydraulic pumps according to the embodiments described heretofore is now discussed with reference to FIG. 4. With respect to the described embodiments, the "plurality of hydraulic pumps" refers to pumps 100 and 110 in FIG. 1, pumps 101 and 111 in FIG. 2 and pumps 100, 110 and 115 in FIG. 3. In other embodiments, and in general, the disclosed method can be employed in systems that have two or more hydraulic pumps. It is contemplated that each hydraulic pump can be identical or one or more of the pumps can be different. For example, in the embodiment of FIG. 3, pumps 100, 110 and 115 can be identical electrically driven pumps that have identical pump speeds and cyclic displacement volumes when they are actuated by equivalent power signals (voltage signals or current signals). Alternatively, by way of example, one of these pumps can be a different electrically driven pump that has a different pump speed and/or cyclic displacement volume compared to the other pumps when they are actuated by equivalent power signals. Using hydraulic pumps that are all the same has the advantage of a simpler control strategy, with prioritization based primarily on factors associated with wear, so that operational use is evened out over the duration of a service interval. Using hydraulic pumps that are different can be useful to allow a broader range of flow rates, for applications where there is a wider range of flow requirements.

Figure 4:
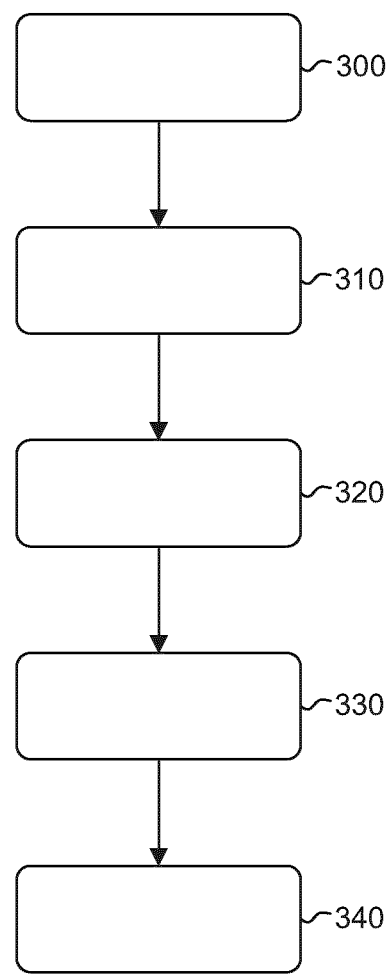
FIG. 4 is a flow chart of a technique for operating the hydraulic pumps in the hydraulic systems of FIGS. 1, 2 and 3.

With reference now to FIG. 4, in step 300, hydraulic pump priority is determined for each hydraulic pump before the pumps are operated. Each hydraulic pump is assigned its priority such that higher priority pumps are operated before lower priority pumps (that is the hydraulic pumps are operated in descending order of priority from highest priority to lowest priority) and the number of hydraulic pumps that are operated depends on selected performance criteria and hydraulic flow demand. For example, depending upon the selected performance criteria for the hydraulic pumps, if the highest priority pump can supply all of the demanded hydraulic flow then it is the only hydraulic pump that it is operated. The controller can be programmed to consider step 300 periodically, for example, whenever a predetermined priority assignment event occurs. At step 300 when a predetermined priority assignment event occurs, the controller can be programmed to access data that corresponds to how many cycles each one of the hydraulic pumps have been operated, and if a predetermined condition is met, then the assigned priorities of the plurality of hydraulic pumps are changed to even out operational wear of the pumps. It is desired to use the least worn hydraulic pump as the primary pump (highest priority), which is the pump that will be employed to provide all or at least a portion of hydraulic flow demand. The priority assignment event can comprise powering-on controller 130, a key switch ignition event for engine 20, a change in status of any hydraulic pump and after a predetermined amount of time before the previous priority assignment event. As an example of a change in status, when a hydraulic pump reports a fault such that the hydraulic pump is no longer in an operational state the pump priorities would be reassigned. Another priority assignment event can occur when cryogenic pumping apparatus 60 transitions from a suspended state, where apparatus 60 is not performing pumping cycles, to an operational state where hydraulic motor 80 receives hydraulic flow and apparatus 60 is pumping gaseous fuel. For each hydraulic pump the assigned priority can be determined according one of equations 1, 2, 3 and 4 below, or a combination of these equations.

$$\text{Hydraulic Pump Priority} = f(N_c) \qquad \text{Equation 1}$$

$$\text{Hydraulic Pump Priority} = f(N_{cs}) \qquad \text{Equation 2}$$

$$\text{Hydraulic Pump Priority} = f(A_{PT}) \qquad \text{Equation 3}$$

$$\text{Hydraulic Pump Priority} = f(A_{IT}) \qquad \text{Equation 4}$$

In equation 1, hydraulic pump priority is determined as a function of hydraulic pump cycle count $N_c$, which represents the cumulative number of pumping cycles the respective hydraulic pump has made. For a rotary-type pump a pumping cycle can also be referred to as a revolution, although it is conceivable that these terms can be used interchangeably for a variety of pumps. The greater the number of cumulative pumping cycles the lower the priority. In equation 2, hydraulic pump priority is determined as a function of compression stroke count $N_{cs}$, which represents the cumulative number of compression strokes fuel pump 60 has made while the speed of the respective hydraulic pump was nonzero, that is while the pump was operating. During compression strokes of fuel pump 60 the pressure of hydraulic fluid in hydraulic supply line 140 (seen in FIGS. 1, 2 and 3) is relatively high compared to the pressure during retraction strokes of fuel pump 60 and to when fuel pump 60 is not operating but hydraulic fluid is still being circulated through lines 140 and 145. Hydraulic pump cycles during compression strokes cause increased wear compared to other hydraulic pump cycles since the operating hydraulic pumps must pressurize the hydraulic fluid to greater pressures in line 140. In equation 3, hydraulic pump priority is determined as a function of the area under the pressure versus time curve. Hydraulic pressure in line 140 can be monitored by controller 130 with pressure sensor 142, whereby the pressure against which each hydraulic pump is pumping can be recorded for each hydraulic pump when it is operating, with these pressures and the time working against these pressures can be stored as data associated with each hydraulic pump. When an individual pump is not operating the pressure recorded for this non-operational time is recorded as zero in the recorded data. If the recorded pressure is plotted against time, the area under the pressure versus time curve is indicative of pump wear, where a larger area represents increased wear. In other embodiments equation 3 can include parameters for pump speed and pump displacement volume. When the hydraulic pumps are electrically driven, equation 4 can be employed to determine hydraulic pump priority as a function of the area under a current versus time curve. The current represents the electrical energy supplied to each hydraulic pump which correlates to pump torque when the hydraulic pump is a rotary pump, or pump force when the pump is a reciprocating piston type (or linear) pump, both of which correlate to hydraulic pump wear. In other embodiments equation 4 can include a parameter for the pressure in hydraulic line 140, as measured by pressure sensor 142 or as determined indirectly from other measured system parameters.

Referring again to FIG. 4, in step 310 gas flow demand for engine 20 is determined, which can be accomplished in a variety of ways. Controller 130 can receive a message comprising gas flow demand sent from another controller. For example, when controller 130 is not a base engine electronic control unit (ECU) then the message can be sent from the base engine ECU. This message can be sent over an asynchronous bus, such as the CAN bus, or over a synchronous bus. Alternatively or additionally, gas flow demand can be determined as a function of engine speed and one of torque demand or pedal position, or it can be inferred based on a rate of change of gaseous fuel pressure as measured by pressure sensor 280 in FIG. 3. Hydraulic flow demand is calculated in step 320 as a function of gas flow demand, and is the hydraulic fluid flow rate required to actuate hydraulic motor 80 such that fuel pump 60 supplies the gaseous fuel flow rate demanded by engine 20.

Hydraulic pumps are selected in step 330 and the selected pumps are operated in step 340 to supply hydraulic fluid to motor 80 to meet hydraulic flow demand. There are a variety of techniques that can be employed to select how many hydraulic pumps will operate and how hydraulic flow demand will be divided amongst the pumps. For illustrative purposes an embodiment with three electrically driven pumps, such as the system shown in FIG. 3, is used to explain three such techniques. For simplicity, in this example the three hydraulic pumps have identical specifications, and each one of hydraulic pumps 100, 110 and 115 is prioritized into one of a primary pump (highest priority), a secondary pump (medium priority) and a tertiary pump (lowest priority). Two hydraulic fluid flow rate thresholds are used in the selection of the hydraulic pumps. Since the hydraulic pumps are identical the thresholds are the same for each pump. Low flow threshold ($F_{LOW}$) corresponds to the hydraulic flow rate each hydraulic pump can supply by itself operating at a minimum allowed speed. High flow threshold ($F_{HIGH}$) corresponds to a calibrated hydraulic flow rate each hydraulic pump can supply by itself operating at a maximum allowed speed.

In a first technique, primary flow ($F_P$), which is the hydraulic flow that is provided by the primary pump, is calculated according to equation 4 below. Equation 4 is a two-step logic process. First, the minimum one of hydraulic flow demand and high flow threshold $F_{HIGH}$ is selected. Each hydraulic pump cannot supply hydraulic flow above the high flow threshold. Second, the maximum one of the selected flow rate from the previous step and low flow threshold ($F_{LOW}$) is selected. The hydraulic pumps cannot accurately supply hydraulic flow below low flow threshold ($F_{LOW}$). Secondary flow ($F_S$), which is the hydraulic flow provided by the secondary pump, is calculated according to equation 5 below when hydraulic flow demand is greater than primary flow ($F_P$). Equation 5 is similar to equation 4 and will not be discussed in detail. Tertiary flow ($F_T$), which is the hydraulic flow provided by the tertiary pump, is calculated according to equation 6 below when hydraulic flow demand is greater than the combined flow rate of primary flow ($F_P$) and secondary flow ($F_S$). Equation 6 is similar to equations 4 and 5 and will not be discussed in detail. The first technique requires the fewest number of hydraulic pumps to operate for a given hydraulic flow demand thereby reducing wear on the greatest number of pumps. Higher priority pumps will experience accelerated wear compared to the next technique which is now discussed.

$$F_P = \max[\min[\text{hydraulic flow demand}, F_{HIGH}], F_{LOW}] \qquad \text{equation 4}$$

$$F_S = \max[\min[\text{hydraulic flow demand} - F_P, F_{HIGH}], F_{LOW}] \qquad \text{equation 5}$$

$$F_T = \max[\min[\text{hydraulic flow demand} - F_P - F_S, F_{HIGH}], F_{LOW}] \qquad \text{equation 6}$$

In a second technique, when the hydraulic pumps operate they each provide the same hydraulic flow rate. When each of the hydraulic pumps are identical they will each consume the same power, operate at the same speed and have the same volumetric flow rate versus power consumption ratio. Depending upon the magnitude of hydraulic flow demand, either no pumps operate, or just the primary pump operates, or only the primary and secondary pumps operate, or the primary, secondary and tertiary pumps operate. For example, when hydraulic flow demand is less than low flow threshold ($F_{LOW}$) then no pumps operate. When hydraulic flow demand is greater than $F_{LOW}$ but less than a first threshold then primary flow ($F_P$) equals hydraulic flow demand. When hydraulic flow demand is greater than the first threshold but less than a second threshold, then primary flow ($F_P$) and secondary flow ($F_S$) both equal one half hydraulic flow demand. When hydraulic flow demand is greater than the second threshold then primary flow ($F_P$), secondary flow ($F_S$) and tertiary flow ($F_T$) are all equal to one third of hydraulic flow demand. By design the maximum commanded hydraulic flow demand is less than the combined flow rates of the hydraulic pumps. The first and second thresholds can be adjusted such that power consumption is reduced and preferably minimized. The second technique reduces power consumption compared to the first technique since the power consumption versus flow rate curve for the hydraulic pumps is not linear, and as the flow rate increases the rate of increase of power consumption increases. In other embodiments the second technique can comprise one of equalizing the power consumption of the pumps, equalizing the pump speeds and the equalizing volumetric flow rate versus power consumption ratio.

In a third technique for selecting hydraulic pumps and dividing hydraulic flow demand, total hydraulic pump power consumption is reduced by calculating the power consumed by each hydraulic pump as a function of two or more parameters and employing an algorithm to determine a reduced power operating point. In the illustrative example above for the second technique of step 330 in FIG. 4, the hydraulic pumps were identical electrically driven centrifugal pumps. When these hydraulic pumps are each actuated by equivalent power signals they will consume the same power, have identical speeds and provide equivalent hydraulic flows. When the electrically driven hydraulic pumps are not identical then equivalent power signals will result in different power consumptions, different pump speeds and different hydraulic flows. The third technique can be employed to determine power signals (that is voltage signals or current signals) for respective pumps such that total hydraulic pump power consumption is reduced compared to the second technique, whether the pumps are identical or not. Power consumption is determined for each hydraulic pump as a function of at least two parameters selected from hydraulic flow rate, hydraulic outlet pressure, hydraulic fluid temperature, hydraulic pump input current, hydraulic pump input voltage and hydraulic fluid viscosity. A minima point on the power consumption versus hydraulic flow surface can be determined (by employing an algorithm to locate the minima) such that for each hydraulic pump the required power signal can be determined. As an example, when there are two hydraulic pumps the surface exists in three dimensional space and comprises the set of points ($F_P,F_S,P_T$) where for each point primary flow ($F_P$) and secondary flow ($F_S$) added together equal hydraulic flow demand and $P_T$ is the combined total power consumption of the primary and secondary pumps. After locating the points on the surface where $P_T$ is at the minima, the power signals for the primary pump and the secondary pump can be determined as a function of primary flow $F_P$ and a function of the secondary flow $F_S$ respectively. Respective lookup tables can be employed in place of functions. When there are three hydraulic pumps, the surface exists in four dimensional space and comprises the set of points ($F_P,F_S,F_T,P_T$) where for each point $FF_P$, $F_S$ and $F_T$ added together equal hydraulic flow demand and $P_T$ is the combined total power consumption of the primary, secondary and tertiary pumps. After a minima point is located on the surface defined by the set of points ($F_P,F_S,F_T,P_T$) then for each hydraulic pump a lookup table can be employed to determine respective power signals. The dimension of the lookup table depends upon the number of parameters employed to calculate respective hydraulic pump power consumptions. The minima points for the 3D surface and the minima point for the 4D surface can be compared to determine which of the two points provide the lower total power consumption for the hydraulic pumps.

In other embodiments the hydraulic pumps must be operated at identical speeds when operating in parallel, otherwise when the pumps are operated at different speeds backflow can potentially damage the pumps. In these embodiments when the plurality of hydraulic pumps must be operated simultaneously in parallel at the same speed, the maximum speed at which all pumps operate is the maximum speed of the slowest pump. There are a variety of reasons why the hydraulic pumps have different speed capabilities. For example, the pumps can be different types of pumps, or one of the pumps may be operating at reduced performance and cannot achieve the same speed as the other pumps. The hydraulic flow demand may not be achievable when one of the pumps is not operating at normal performance levels, and in this situation the operating condition of the engine system can be derated.

While a system with a plurality of identical hydraulic pumps has been used to describe the disclosed method, the same control strategy can be applied to a system with pumps of different size and specification. Just like in the described example, the controller can be programmed to determine which hydraulic pumps to operate to achieve the desired result, whether that be reducing power consumption, reducing the number of hydraulic pump cycles or a predetermined combination.

While particular elements, embodiments and applications of the present invention have been shown and described, it will be understood, that the invention is not limited thereto since modifications can be made by those skilled in the art without departing from the scope of the present disclosure, particularly in light of the foregoing teachings. For example, FIGS. 1 and 2 show a system with two hydraulic pumps and FIG. 3 shows a system with three hydraulic pumps, but the same concepts described with respect to these embodiments can be applied to like systems with a different number of hydraulic pumps.

What is claimed is:

1. A hydraulic system for delivering hydraulic fluid to a hydraulic motor in a cryogenic pumping apparatus in an engine system fuelled with a gaseous fuel, comprising:
    a source of hydraulic fluid;
    a plurality of hydraulic pumps, respective inlets of said plurality of hydraulic pumps in fluid communication with said source of hydraulic fluid and respective outlets of said plurality of hydraulic pumps in fluid communication with a delivery line in fluid communication with said hydraulic motor;
    a return line from said cryogenic pumping apparatus to said source of hydraulic fluid;
    a controller operatively connected with said plurality of hydraulic pumps and programmed to:

periodically determine a priority for each hydraulic pump as a function of predetermined criteria, wherein higher priority hydraulic pumps are operated before lower priority hydraulic pumps to supply hydraulic fluid to said hydraulic motor;

determine gas flow demand of said engine system;

calculate hydraulic flow demand required for said hydraulic motor to actuate said cryogenic pumping apparatus to provide said gas flow demand;

select hydraulic pumps to supply said hydraulic flow demand; and operate said selected hydraulic pumps to supply said hydraulic flow demand, each hydraulic pump that is operated has an equal priority or a higher priority than each hydraulic pump that is not operated.

2. The hydraulic system of claim 1, wherein for each hydraulic pump, priority is determined as a function of at least one of:

a count of respective cumulative pumping cycles;

a count of cumulative compression strokes of said cryogenic pumping apparatus while respective hydraulic pump speed is nonzero;

area under respective pressure versus time curves when respective hydraulic pumps are operating;

area under respective current versus time curves when respective hydraulic pumps are operating; and respective hydraulic pump status.

3. The hydraulic system of claim 1, wherein said priority is determined when at least one of the following priority assignment events occurs:

said controller is powered on;

said engine system is powered on;

hydraulic pump status for any one of said plurality of hydraulic pumps changes;

after a predetermined amount of time since a previous priority assignment event; and said cryogenic pumping apparatus changes from a suspended state to an operational state.

4. The hydraulic system of claim 1, wherein one of:

when two or more hydraulic pumps are selected to operate each one of these hydraulic pumps provides an identical hydraulic flow rate; and when two or more hydraulic pumps are selected to operate, said selected hydraulic pump with the lowest priority supplies a hydraulic flow rate less than a maximum hydraulic flow rate, and said selected hydraulic pumps with priorities greater than the lowest priority provide said maximum hydraulic flow rate.

5. The hydraulic system of claim 1, wherein said selected hydraulic pumps are operated in at least one of:

a first mode comprising equalizing hydraulic fluid flow from each hydraulic pump within a predetermined flow tolerance;

a second mode comprising equalizing power consumption of each hydraulic pump within a predetermined power tolerance;

a third mode comprising equalizing hydraulic pump speed of each hydraulic pump within a predetermined speed tolerance;

a fourth mode comprising equalizing volumetric flow rate versus power consumption for each hydraulic pump within a predetermined tolerance; and a fifth mode comprising selecting a power consumption for each hydraulic pump as a function of at least one of said hydraulic fluid flow rate, hydraulic fluid outlet pressure, hydraulic fluid temperature, hydraulic pump input current, hydraulic pump input voltage and hydraulic fluid viscosity whereby a power consumption is reduced compared to said first, second, third and fourth modes.

6. The hydraulic system of claim 1, wherein one of:

said plurality of hydraulic pumps are electrically driven hydraulic pumps; and said plurality of hydraulic pumps are variable displacement hydraulic pumps.

7. The hydraulic system of claim 1, wherein at least one hydraulic pump is specified differently than the other hydraulic pumps.

8. The hydraulic system of claim 1, further comprising a cryogenic storage vessel, wherein said engine system is fuelled with said gaseous fuel from a vapor space in said cryogenic storage vessel when pressure in said vapor space is above a predetermined value, and from a liquid space in said storage vessel when said pressure is below said predetermined value, said cryogenic pumping apparatus pressurizing gaseous fuel from said liquid space.

9. A system for delivering fuel to an internal combustion engine comprises:

a fuel pump;

a hydraulic motor for said fuel pump;

a plurality of hydraulic pumps, arranged in parallel to pump hydraulic fluid from a hydraulic fluid reservoir to said hydraulic motor;

a controller in communication with said hydraulic pumps, said controller receiving inputs and programmed to determine a commanded speed for said fuel pump, said controller further programmed to determine a priority for each hydraulic pump as a function of predetermined criteria, wherein higher priority hydraulic pumps are operated before lower priority hydraulic pumps to supply hydraulic fluid to said hydraulic motor and to determine which ones of said hydraulic pumps operate to deliver hydraulic fluid to said hydraulic motor;

conduits for delivering hydraulic fluid from said reservoir to said plurality of hydraulic pumps, from said plurality of hydraulic pumps to said hydraulic motor, and then from said hydraulic motor back to said reservoir; and valves controlled by said controller to direct hydraulic fluid through said conduits.

10. The system of claim 9, wherein said fuel pump is a cryogenic pump for pumping a liquefied gaseous fuel.

11. The system of claim 9, wherein at least one of:

said controller records operational data associated with each one of said plurality of hydraulic pumps, and factors respective hydraulic pump operational cycles into its determination of which ones of said plurality of hydraulic pumps to operate; and said controller is programmed to operate said plurality of hydraulic pumps to distribute operational cycles according to a predetermined proportion.

12. The system of claim 9, wherein said predetermined proportion distributes operational cycles substantially evenly between system service intervals.

13. The system of claim 9, wherein said controller determines a priority for selecting which one of said plurality of hydraulic pumps to operate, said priority being determined as a function of at least one of:

a count of respective cumulative pumping cycles;

a count of cumulative compression strokes of said cryogenic pumping apparatus while respective hydraulic pump speed is nonzero;

area under respective pressure versus time curves when respective hydraulic pumps are operating; and area under respective current versus time curves when respective hydraulic pumps are operating.

14. The system of claim 9, wherein said priority is determined periodically.

15. The system of claim 9, wherein said priority is determined when one of the following events occurs:
said controller is powered on;
said engine system is powered on;
there is a change in hydraulic pump status for any one of said plurality of hydraulic pumps;
there has not been a determination of priority for more than a predetermined amount of time; and
said cryogenic pumping apparatus changes from a suspended state to an operational state.

16. A method of operating a plurality of hydraulic pumps for delivering hydraulic fluid to a hydraulic motor in a cryogenic pumping apparatus in an engine system fuelled with a gaseous fuel, comprising:
periodically determining a priority for each hydraulic pump as a function of respective hydraulic pump wear, wherein higher priority hydraulic pumps are operated before lower priority hydraulic pumps to supply hydraulic fluid to said hydraulic motor;
determining gas flow demand of said engine system;
calculating hydraulic flow demand required for said hydraulic motor to actuate said cryogenic pumping apparatus to provide said gas flow demand;
selecting hydraulic pumps to supply said hydraulic flow demand; and
operating said selected hydraulic pumps to supply said hydraulic flow demand, each hydraulic pump that is operated has an equal priority or a higher priority than each hydraulic pump that is not operated.

17. The method of claim 16, wherein determining said priority for each hydraulic pump, further comprising one of:
counting respective cumulative pumping cycles;
counting cumulative compression strokes of said cryogenic pumping apparatus while respective hydraulic pump speed is nonzero;
determining area under respective pressure versus time curves when respective hydraulic pumps are operating; and
determining area under respective current versus time curves when respective hydraulic pumps are operating.

18. The method of claim 16, wherein determining said priority for each hydraulic pump, further comprising one of:
detecting when a controller is powered on;
detecting when said engine system is powered on;
detecting a change in hydraulic pump status for anyone of said plurality of hydraulic pumps;
detecting a predetermined amount of time since a previous priority assignment event; and
detecting when said cryogenic pumping apparatus changes from a suspended state to an operational state.

19. The method of claim 16, further comprising:
determining a minima point on a power consumption versus hydraulic flow rate surface; and
determining respective power signals for each hydraulic pump as a function of said minima point;
wherein hydraulic flow demand is supplied when said selected hydraulic pumps are operated with respective power signals.

20. The method of claim 19, further comprising determining power consumption for each hydraulic pump as a function of at least one of said hydraulic fluid flow rate, hydraulic fluid outlet pressure, hydraulic fluid temperature, hydraulic pump input current, hydraulic pump input voltage and hydraulic fluid viscosity.

* * * * *